(12) United States Patent
Harkleroad et al.

(10) Patent No.: US 12,168,421 B2
(45) Date of Patent: Dec. 17, 2024

(54) SYSTEMS, METHODS, AND APPARATUS FOR SMART MULTI-TIER POWER RUNNING BOARD WITH GROUND SENSING TECHNOLOGIES

(71) Applicant: Toyota Motor Engineering & Manufacturing North America, Inc., Plano, TX (US)

(72) Inventors: John D. Harkleroad, Ypsilanti, MI (US); Manish Shah, Canton, MI (US); Aamir U Warsi, Canton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 176 days.

(21) Appl. No.: 17/840,299

(22) Filed: Jun. 14, 2022

(65) Prior Publication Data
US 2023/0398937 A1 Dec. 14, 2023

(51) Int. Cl.
*B60R 3/00* (2006.01)
*B60R 3/02* (2006.01)

(52) U.S. Cl.
CPC ............... *B60R 3/002* (2013.01); *B60R 3/02* (2013.01)

(58) Field of Classification Search
CPC ................................. B60R 3/002; B60R 3/02
See application file for complete search history.

(56) References Cited

U.S. PATENT DOCUMENTS

| | | | |
|---|---|---|---|
| 7,070,194 B2 | 7/2006 | Garland et al. | |
| 7,318,596 B2 | 1/2008 | Scheuring, III et al. | |
| 7,377,531 B2 | 5/2008 | Fabiano et al. | |
| 10,144,345 B2 | 5/2018 | Stinson et al. | |
| 10,046,707 B2 | 8/2018 | Churchwell et al. | |
| 10,336,260 B1* | 7/2019 | Salter | B60R 3/02 |
| 11,458,900 B2 | 10/2022 | Watson | |
| 2006/0175791 A1* | 8/2006 | Kaempe | B60R 3/002 |
| | | | 280/166 |
| 2010/0194070 A1 | 8/2010 | Stauffer et al. | |
| 2017/0274828 A1 | 9/2017 | Woodhouse et al. | |
| 2017/0298675 A1* | 10/2017 | Dimig | B60R 3/02 |
| 2022/0332252 A1* | 10/2022 | Erasala | B60R 3/02 |

(Continued)

FOREIGN PATENT DOCUMENTS

EP 3560788 A1 6/2021

*Primary Examiner* — Tyler J Lee
*Assistant Examiner* — Kimia Kohankhaki
(74) *Attorney, Agent, or Firm* — Snell & Wilmer LLP

(57) ABSTRACT

An apparatus, a system, and a method for providing a smart multi-tier power running board (PRB) with ground sensing technologies. The apparatus includes one or more support bars, one or more steps, an actuator connected to one end of each support bar of the one or more support bars, one or more sensors, and a controller coupled to the actuator and the one or more sensors. The controller is configured to: obtain data indicative of a request to move the one or more support bars from a stowed position to a deployed position; determine, based on sensor data detected by the one or more sensors, the deployed position for moving the one or more support bars; and control, based on the determined deployed position, the actuator to move the one or more support bars from the stowed position to the deployed position.

20 Claims, 6 Drawing Sheets

(56) References Cited

U.S. PATENT DOCUMENTS

| | | | |
|---|---|---|---|
| 2023/0053760 A1* | 2/2023 | Salter | B60R 3/02 |
| 2023/0256909 A1* | 8/2023 | Salter | B60R 3/002 |
| | | | 280/166 |
| 2023/0294608 A1 | 9/2023 | Gaither | |
| 2023/0398937 A1 | 12/2023 | Harkleroad et al. | |

* cited by examiner

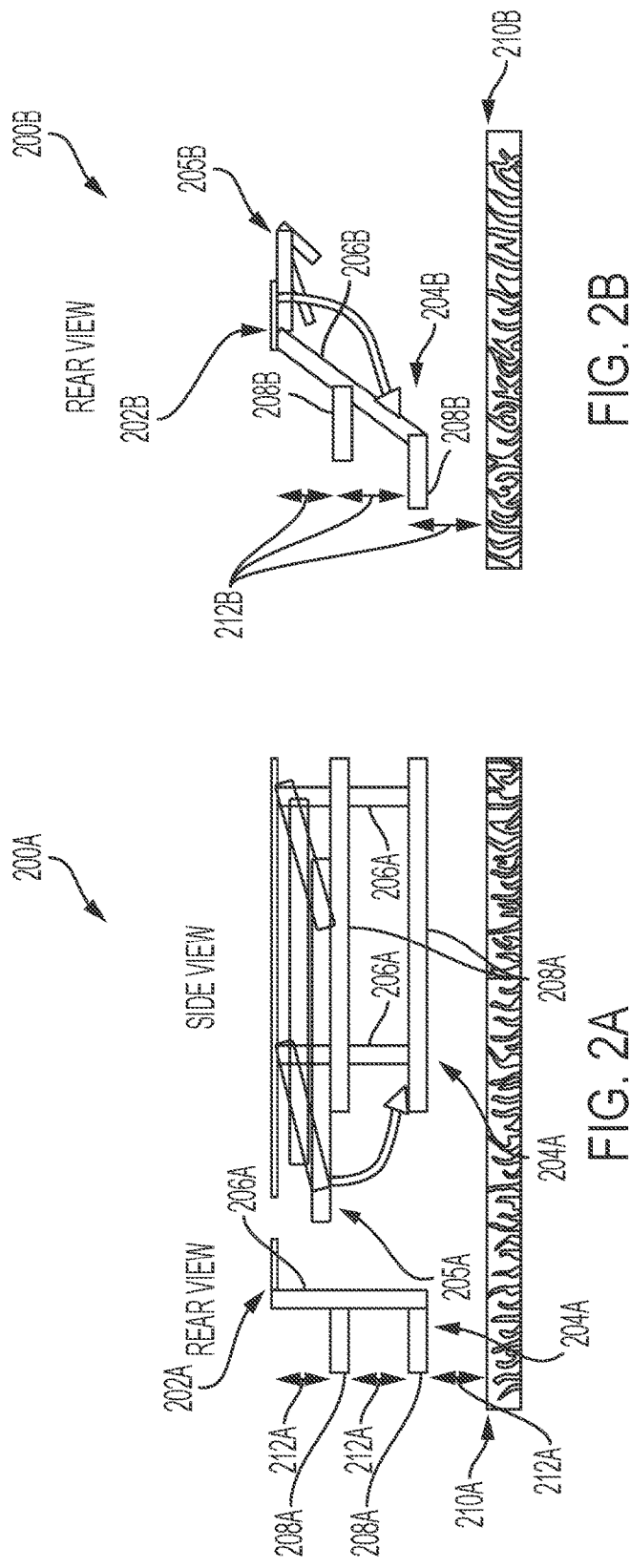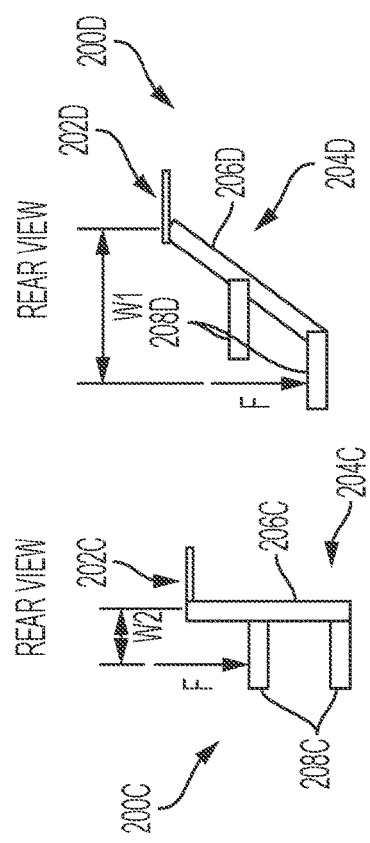

SYSTEMS, METHODS, AND APPARATUS FOR SMART MULTI-TIER POWER RUNNING BOARD WITH GROUND SENSING TECHNOLOGIES

BACKGROUND

Field

The present disclosure is directed to systems, methods, and apparatus for providing a smart multi-tier power running board (PRB) with ground sensing technologies.

Description of the Related Art

A vehicle such as a truck or a sport utility vehicle (SUV) often utilizes a set of large tires and/or includes a suspension system with a high ride height which can make it difficult for a driver and/or a passenger to climb into or out of the vehicle. Such a vehicle is often utilized for off-roading. Off-roading is an activity of driving or riding in a vehicle on unsurfaced roads or tracks, and it is a popular activity with a large customer base in automotive industry. In order to improve vehicle performance, especially for an activity such as off-roading, a user or driver (e.g., an off-roading enthusiast) often lifts suspension of his or her vehicle (including the off-road vehicle such as an off-road truck or SUV). Lifting the suspension raises the ride height further, and there is a need for running boards (e.g., a multi-tier running board) for easier and safer ingress and egress of the vehicles including the off-road vehicles and the vehicles with the lifted suspensions.

While there are some running boards available to address the foregoing need, the off-roading often takes place on the unsurfaced roads or tracks which are often made of material such as sand, gravel, riverbeds, mud, snow, rocks, and/or another natural terrain. Such a variety of different and unpredictable status of the roads or tracks result in a variety of different and unpredictable ground clearance between the ground and the vehicle. However, a conventional manual or power running board has pre-determined spacing between its steps which may not work well with the various and unpredictable levels of ground clearance observed for such activities as off-roading. That is, for example, the lowest step of the conventional running board on a vehicle may be too high from the ground and/or the pre-determined spacing between the steps of the conventional running board may not be ideal for certain drivers and/or passengers. Such a running board may lead to, e.g., potential fall or trip hazards and/or cause inconvenience for getting in and/or out of the vehicle. The conventional manual or power running boards have pre-determined spacing between their steps and cannot adjust the spacing between the steps. Hence, there is a need for more advanced systems, methods, and apparatus for providing a smart multi-tier power running board (PRB) with ground sensing technologies.

SUMMARY

Described herein is an adjustable running board apparatus for a vehicle. The apparatus includes one or more support bars movably attached to the vehicle and configured to move between a stowed position and a deployed position. The apparatus also includes one or more steps each attached to the one or more support bars. The apparatus further includes an actuator connected to one end of each support bar of the one or more support bars and configured to cause the one or more support bars to move between the stowed position and the deployed position. Still further, the apparatus includes one or more sensors attached to at least one of (i) the one or more support bars, (ii) the one or more steps, or (iii) the vehicle and configured to detect sensor data related to a ground clearance between a ground and the vehicle. Moreover, the apparatus includes a controller coupled to the actuator and the one or more sensors. The controller is configured to obtain data indicative of a request to move the one or more support bars from the stowed position to the deployed position. The controller is also configured to determine, based on the detected sensor data, the deployed position for moving the one or more support bars. The controller is further configured to control, based on the determined deployed position, the actuator to move the one or more support bars from the stowed position to the deployed position.

In some embodiments, the one or more support bars are movably attached within a threshold distance from a component on the vehicle. The component may be a door, a roof, or a tail gate on the vehicle, and the adjustable running board apparatus may be configured for ingress or egress of, respectively, a cabin space, the roof, or a truck bed on or within the vehicle. The sensor data include information related to a highest point of the ground below the component on the vehicle. The determination of the deployed position of the one or more support bars includes a determination of a distance between the component on the vehicle and the highest point of the ground and an even division of the distance between the component on the vehicle and the highest point of the ground based on a number of the one or more steps to be deployed. In some implementations, the sensor data further include information related to the ground clearance between the truck bed on the vehicle and the roof on the vehicle. The adjustable running board apparatus is configured for ingress or egress of the roof on the vehicle from or to the truck bed on the vehicle. The determination of the deployed position of the one or more support bars includes a determination of a distance between the roof on the vehicle and the truck bed on the vehicle and an even division of the distance between the roof on the vehicle and the truck bed on the vehicle based on the number of the one or more steps to be deployed.

In some embodiments, the one or more sensors include a RADAR (Radio Detection and Ranging) sensor attached to an exterior component or the adjustable running board apparatus on the vehicle.

In some embodiments, the one or more sensors include a LIDAR (Light Detection and Ranging) sensor attached to an exterior component or the adjustable running board apparatus on the vehicle.

In some embodiments, the one or more sensors include an image sensor attached to an exterior component or the adjustable running board apparatus on the vehicle.

In some embodiments, the one or more support bars in the deployed position are configured to be substantially perpendicular to a bottom surface on the vehicle facing the ground.

In some embodiments, the one or more support bars in the deployed position are configured to be at an angle greater than 90 degrees with a bottom surface on the vehicle facing the ground such that a step of the one or more steps closest to the ground is radially farther from the vehicle than a step of the one or more steps closest to the bottom surface on the vehicle.

Also described herein is an adjustable running board system for a vehicle. The system includes one or more support bars movably attached to the vehicle and configured to move between a stowed position and a deployed position. The system also includes one or more steps each attached to the one or more support bars. The system further includes an actuator connected to one end of each support bar of the one or more support bars and configured to cause the one or more support bars to move between the stowed position and the deployed position. Still further, the system includes one or more sensors attached to at least one of (i) the one or more support bars, (ii) the one or more steps, or (iii) the vehicle and configured to detect sensor data related to a ground clearance between a ground and the vehicle. Moreover, the system includes a controller coupled to the actuator and the one or more sensors. The controller is configured to obtain data indicative of a request to move the one or more support bars from the stowed position to the deployed position. The controller is also configured to determine, based on the detected sensor data, the deployed position for moving the one or more support bars. The controller is further configured to control, based on the determined deployed position, the actuator to move the one or more support bars from the stowed position to the deployed position.

In some embodiments, the vehicle includes a pocket or recess, and the one or more support bars are configured to be moved into the pocket or recess when the one or more support bars are in the stowed position.

In some embodiments, the vehicle includes a bottom surface facing the ground, and the one or more support bars are configured to be moved to be underneath and substantially parallel with the bottom surface on the vehicle when the one or more support bars are in the stowed position.

In some embodiments, the one or more steps are each movably attached to the one or more support bars and configured to move between (a) a first position when the one or more support bars are in the stowed position and (b) a second position when the one or more support bars are in the deployed position, and the one or more steps are configured to be in the first position to save space and in the second position to allow a driver or passenger to step on the one or more steps.

In some embodiments, the determination of the deployed position of the one or more support bars includes a determination of a position of the one or more support bars and a position of the one or more steps such that a first distance between the vehicle and a step of the one or more steps farthest from the ground, a second distance between two consecutive steps of the one or more steps, and a third distance between a step of the one or more steps closest from the ground and the ground are identical.

In some embodiments, the system further includes a memory configured to store profile data including information related to one or more deployed positions of the one or more support bars corresponding to one or more respective drivers or passengers.

Also described herein is a method for providing an adjustable running board system for a vehicle. The method includes obtaining, by a controller, data indicative of a request to move one or more support bars of the adjustable running board system from a stowed position to a deployed position, the one or more support bars being movably attached to the vehicle and configured to move between the stowed position and the deployed position. The method also includes detecting, by one or more sensors in data communication with the controller and attached to at least one of (i) the one or more support bars, (ii) one or more steps attached to the one or more support bars, or (iii) the vehicle, sensor data related to a ground clearance between a ground and the vehicle. The method further includes determining, by the controller and based on the detected sensor data, the deployed position for moving the one or more support bars. Still further, the method includes controlling, by the controller, an actuator in data communication with the controller and attached to the one or more support bars to move the one or more support bars from the stowed position to the deployed position.

In some embodiments, obtaining the data indicative of the request to move the one or more support bars from the stowed position to the deployed position includes detecting that a door on the vehicle is open.

In some embodiments, obtaining the data indicative of the request to move the one or more support bars from the stowed position to the deployed position includes detecting, by a key fob sensor, that a key fob associated with a user is within a threshold distance from the vehicle. The key fob may be configurable to be powered on or off.

In some embodiments, detecting the sensor data includes detecting a highest point of the ground below a door on the vehicle, and determining the deployed position of the one or more support bars includes determining a distance between the vehicle and the highest point of the ground below the door on the vehicle and evenly dividing the distance between the vehicle and the highest point of the ground below the door on the vehicle based on a number of the one or more steps.

In some embodiments, controlling the actuator includes controlling the actuator to automatically move the one or more support bars from the stowed position to the deployed position such that a first distance between the vehicle and a step of the one or more steps farthest from the ground, a second distance between two consecutive steps of the one or more steps, and a third distance between a step of the one or more steps closest from the ground and the ground are identical.

In some embodiments, the method further includes receiving, from a remote device in data communication with the controller, data related to a user input associated with the deployed position of the one or more support bars, and controlling the actuator includes controlling the actuator to move the one or more support bars according to the user input.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIGS. 2A-2C are illustrations of various views of example smart multi-tier PRBs with ground sensing technologies according to various embodiments of the present invention;

DETAILED DESCRIPTION

Disclosed herein are systems, devices, apparatuses, platforms and/or methods for providing a smart multi-tier power running board (PRB) with ground sensing technologies. Particular embodiments of subject matter described in this disclosure may be implemented to realize one or more of following advantages.

In some embodiments, the smart multi-tier PRB disclosed herein adjusts its steps to provide equidistant spacing between the steps to prevent any safety hazard (e.g., fall or trip hazard). Moreover, in some embodiments, the smart multi-tier PRB has a unique feature of ground sensing technologies. For example, the smart multi-tier PRB may be integrated with or attached to a vehicle which includes one or more sensors that can detect information related to a ground clearance based on, e.g., off-road, paved road, and/or residential/commercial driveway usage scenes and accordingly deploy a number of equidistantly spaced PRB steps to prevent any safety hazard (e.g., fall or trip hazard). That is, one or more of a plurality of PRB steps of the smart multi-tier PRB may be automatically deployed such that a desired distance between the deployed PRB steps is achieved. In various embodiments, not all of the available PRB steps may necessarily be deployed—rather, only a subset of the available PRB steps may be deployed such that the distance between the deployed PRB steps (as well as the distance between the ground and the PRB step closest to the ground and the distance between the vehicle and the PRB step closest to the vehicle) allows a safe ingress and/or egress of the vehicle (e.g., based on the desired distance between the deployed PRB steps being achieved). The number of the deployed PRB steps may be based on the information related to the ground clearance detected by the one or more sensors, and the desired distance between the deployed PRB steps may be user- and/or manufacturer-defined. In various embodiments, the PRB steps may be deployed in lateral or longitudinal directions. Furthermore, in some embodiments, the smart multi-tier PRB may detect the ground clearance input from, e.g., the vehicle sensors and/or a user and adjust the steps accordingly to provide equidistant spacing between the steps to prevent any safety hazard (e.g., fall or trip hazard).

Other benefits and advantages include that the system, apparatus, and/or method described herein can be utilized for various applications including, e.g., safely accessing and/or descending from a roof of a vehicle (e.g., accessing and/or descending from a tent disposed on the roof of the vehicle for overlanding), a truck bed (e.g., via a tail gate of a pick-up truck), etc.

As used herein, a "power running board" ("PRB") may refer to an apparatus (e.g., electronically controlled and/or actuated) including one or more steps configured for ingress or egress of any portion of a vehicle (including e.g., a cabin area including driver and passenger seats, a truck bed, a roof, and/or the like).

Figure 1A:
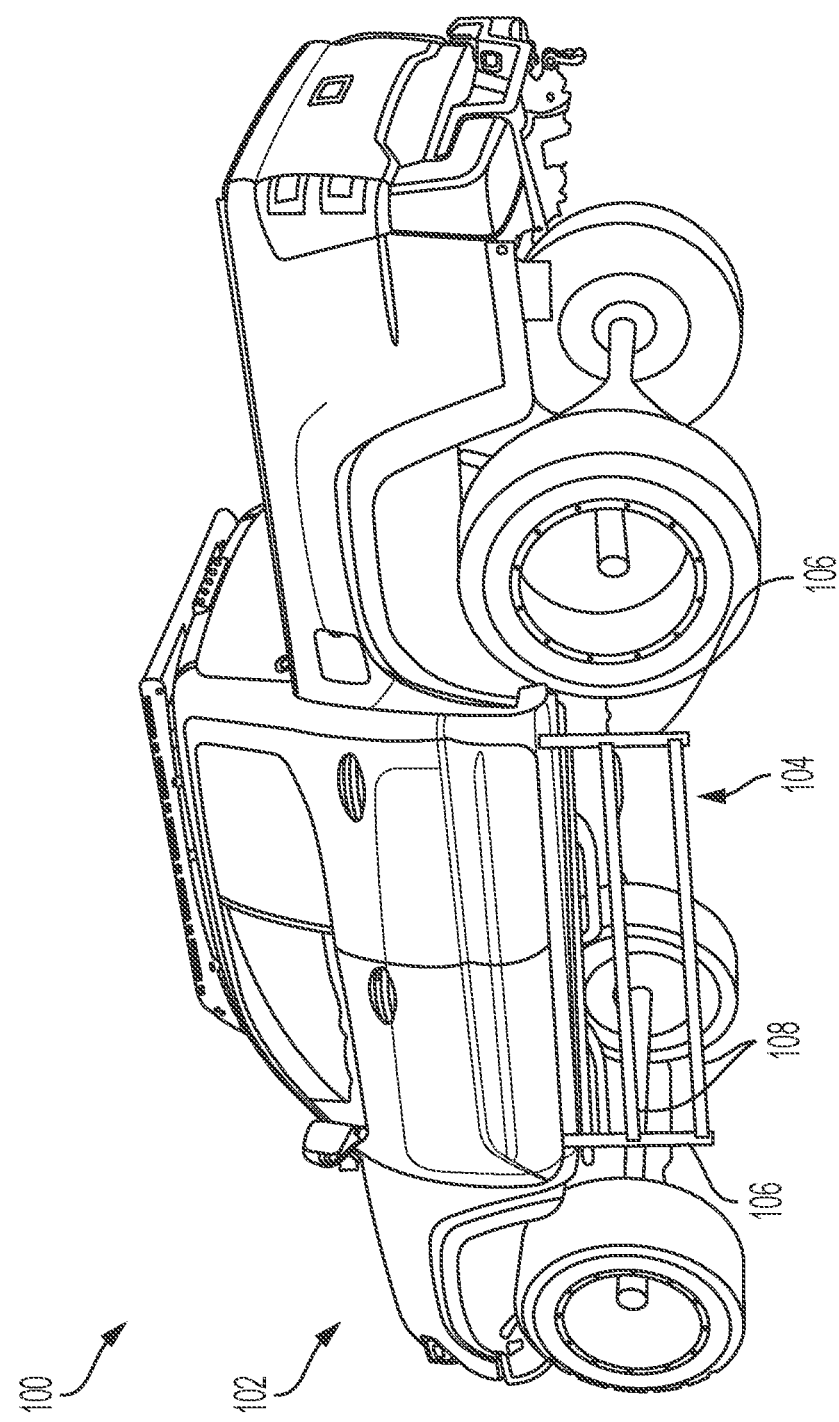
FIGS. 1A and 1B are each an illustration of an example vehicle including an apparatus or system for providing a smart multi-tier power running board (PRB) with ground sensing technologies according to an embodiment of the present invention.

Now turning to FIG. 1A, an illustration of a system 100 for providing a smart multi-tier power running board (PRB) with ground sensing technologies is shown. The system 100 may include a vehicle 102 and a PRB 104, and the PRB 104 may include one or more support bars 106 and one or more steps 108.

In some embodiments, the vehicle 102 may be a pick-up truck (e.g., as shown), a sport utility vehicle (SUV), or any other type of vehicle which may have a relatively high ride height and utilize a running board (e.g., manual or electronically powered) to assist a driver and/or a passenger to get in and/or out of the vehicle 102.

As shown, the PRB 104 may be attached to an exterior surface on the vehicle 102 (e.g., at a door sill below a door on the vehicle 102) and include the one or more support bars 106 and the one or more steps 108. While only two (2) support bars 106 and two (2) steps 108 are shown, it would be appreciated by one of ordinary skill in the art that any number of support bars 106 and/or steps 108 may be utilized for the system 100. In some embodiments, the PRB 104, when in use, may be in a deployed position (e.g., as shown) such that a driver and/or a passenger can utilize the PRB 104 (e.g., by stepping on the steps 108) to get in and/or out of the vehicle 102. In some embodiments, when the PRB 104 is not in use (e.g., when the vehicle 102 is being driven), the PRB 104 may be in a stowed position (e.g., folded up toward a bottom surface on the vehicle 102 facing a ground or retracted into a pocket or recess accessible from the exterior surface and protruding into a cabin space within the vehicle 102 as described further herein. Furthermore, in some embodiments, the PRB 104, when not in use, may be covered by a cover (not shown) which hides the PRB 104 from an outside view when the PRB 104 is in the stowed position.

Figure 1B:
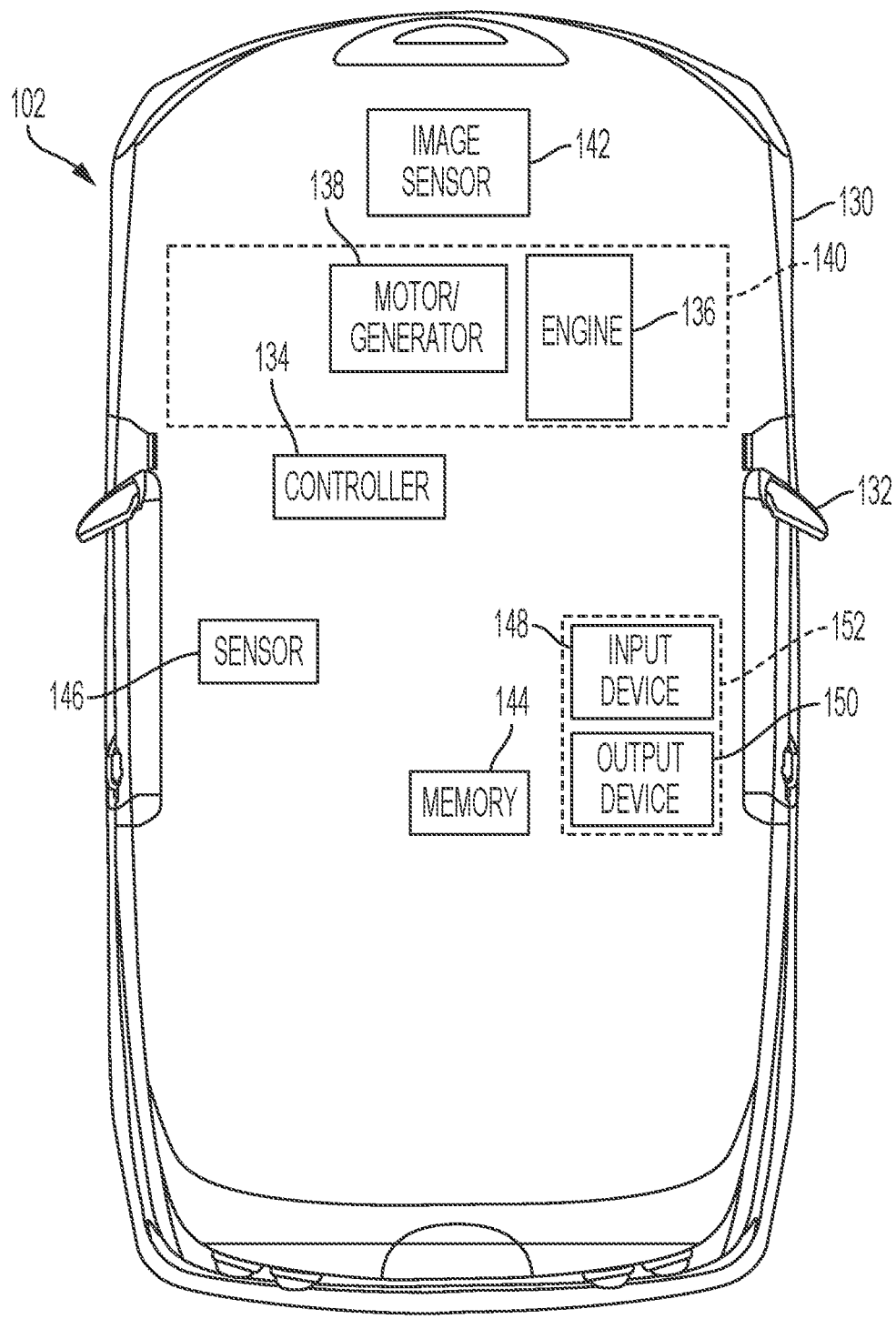

FIG. 1B is a block diagram illustrating the vehicle 102 including the PRB 104 with ground sensing technologies. The vehicle 102 may include a controller 134, a memory 144, a torque source 140 (including a motor-generator 138 and/or an engine 136), an image sensor 142, a sensor 146, and a user interface 152 (including an input device 148 and/or an output device 150) within or on a main body 130. The vehicle 102 may also include one or more side view mirrors 132 on the main body 130.

The main body 130 may be propelled along a roadway. The main body 130 may resemble a vehicle such as a car, a bus, a sport utility vehicle (SUV), a truck, a recreational vehicle (RV), and/or the like and support one or more individuals such as a driver, a passenger, or the like. Furthermore, the main body 130 may define or include a vehicle cabin (not shown) in which the driver, the passenger, or the like may be located and include a space for, e.g., a pocket or recess (not shown) for receiving the PRB 104 when the PRB 104 is in a stowed position as described herein.

In some embodiments, the controller 134 may be included on or within the vehicle 102 and in the system 100 described with reference to FIG. 1A and include or couple to one or more processors. These one or more processors may be implemented as a single processor or as multiple processors. For example, the controller 134 may be a microprocessor, a data processor, a microcontroller, or other controller, and may be coupled to some or all of the other components within the system 100. The functions of the controller 134 may be implemented in a single controller or in multiple controllers. For example, the controller 134 may include a user interface controller (not shown) that controls the user interface 152, a PRB controller (not shown) that controls the PRB 104, and/or the like.

In various embodiments, the controller 134 may be coupled to each of various components on or within the vehicle 102 and may include one or more processors or controllers which may be specifically designed and programmed for, e.g., automotive systems. The functions of the controller 134 may be implemented in a single electronic control unit (ECU) or in multiple ECUs. For example, the controller 134 may include a torque ECU (not shown) that controls the torque source 140, and/or the like. The controller 134 may receive data from one or more of the components on or within the vehicle 102, may make determinations based on the received data, and may control the operations of the one or more of the components based on the determinations. For example, the controller 134 may receive a request to control one or more components (e.g., the torque source 140, and/or the like) to be actuated to cause the vehicle 102 to traverse from one location to another. The request may be based on a user input (e.g., a driver) or one or more types of data captured by, e.g., the image sensor 142, a location sensor (not shown), etc. when the vehicle 102 is being driven, respectively, manually or autonomously. The request may also include, e.g., an input from a brake pedal (not shown) which may be utilized for determining a brake operation based on the received brake request causing one or more components of a brake system (not shown) to be actuated so as to, e.g., slow down or stop movement of the vehicle 102. It would be apparent to one of ordinary skill in the art that other functionalities (e.g., automotive functionalities such as steering) may be achieved in a similar manner.

Furthermore, in some embodiments, the controller 134 may include or cooperate with an ECU for controlling the PRB 104 such as, for example, a smart multi-tier PRB described herein to determine one or more actions (e.g., related to moving the PRB 104 between a stowed position and a deployed position) to be performed by one or more components on or within the vehicle 102. The controller 134 may enable an automatic deployment or retraction of the PRB 104 as described herein.

In some embodiments, the vehicle 102 may be non-autonomous, fully autonomous, or semi-autonomous. In that regard, the controller 134 may control various aspects of the vehicle 102 (such as steering, braking, accelerating, and/or the like) to maneuver the vehicle 102 from a starting location to a destination location. In some embodiments, the vehicle 102 may be operated in an autonomous, semi-autonomous, or fully driver-operated state. In that regard, the vehicle 102 may be operated independently of driver control and, from time to time, without a person inside (e.g., in a driver's seat) of the vehicle 102. The controller 134 may facilitate the autonomous functionality.

The controller 134 may be or include an ECU (not shown) for managing the movement of the PRB 104 discussed herein and be coupled to one or more components of the PRB 104 (e.g., one or more actuators) for managing the movement of the PRB 104. The controller 134 and/or the ECU for the PRB 104 may include one or more processors or controllers which may be specifically designed and programmed for managing the movement of the PRB 104. The functions of the controller 134 and/or the ECU for the PRB 104 (e.g., a dedicated ECU for the PRB 104 (i.e., for managing the movement of the PRB 104)) may be implemented in a single ECU or in multiple ECUs. The controller 134 and/or the ECU for the PRB 104 may monitor and/or control the PRB 104 to at least one of actuate one or more components (e.g., the one or more actuators) to move the PRB 104 or monitor status of the PRB 104 (e.g., whether in the stowed or in the deployed position). In some embodiments, the controller 134 may control the user interface 152 (e.g., the output device 150) to display information related to the monitored status of the PRB 104.

Moreover, in various embodiments, the controller 134 may cooperate with other controllers and/or ECUs or operate by itself to control various components on or within the vehicle 102. Furthermore, the controller 134 may include a control software, hardware, or the like which is communicatively coupled to, e.g., the PRB 104, the memory 144, and/or the user interface 152, as well as any other component on or within the vehicle 102.

The memory 144 may include any non-transitory memory and may store data usable by the controller 134. In some embodiments, the memory 144 may be located within or on the main body 130 and may be referred to as a local memory. In some embodiments, the memory 144 may be located remote from the main body 130 and may be referred to as a remote memory (e.g., as provided by a cloud service). The memory 144 may be a combination of the local memory and the remote memory in various embodiments. In some embodiments, the memory 144 may store data related to the system 100 and the PRB 104 described herein. For example, the memory 144 may store information related to profile data including various deployed positions of the PRB 104 corresponding to various users. In some embodiments, the various deployed positions of the PRB 104 may each be activated based on, e.g., a user input (including, e.g., a button press or the like corresponding to a respective PRB configuration). Furthermore, the memory 144 may store information retrieved from other sources including, for example, profile data related to the deployed positions of the PRB 104 stored in a remote device or in other vehicles, etc. Such information may be retrieved by the system 100 and/or the controller 134 by, for example, the user interface 152 (i.e., as user input entered by a user), a network access device (not shown) (i.e., received via a wired or wireless communication from a third-party/remote device). In some embodiments, the various types of data stored on or within the memory 144 may be stored in various types of data structures and formats—the memory 144 may store a database, a data store, and/or the like.

In some embodiments, the memory 144 may be coupled to a processor (e.g., the controller 134). The memory 144 may store instructions to be executed by the processor and may include one or more of a RAM (Random Access Memory) or other volatile or non-volatile memory. The memory 144 may be a non-transitory memory or a data storage device, such as a hard disk drive, a solid-state disk drive, a hybrid disk drive, or other appropriate data storage, and may further store machine-readable instructions, which may be loaded and executed by the processor.

In various embodiments, the memory 144 may be configured to store profile data including information related to one or more predetermined deployed positions of the PRB 104 (e.g., the one or more support bars 106) corresponding to one or more respective drivers or passengers. For example, depending on the driver or passenger detected by the vehicle 102 (e.g., via one or more sensors), the vehicle 102 may automatically deploy the PRB 104 to be in the deployed position according to previously stored data (which may be stored manually by user input or automatically in the memory 144). In some embodiments, these data can be updated periodically based on, e.g., subsequent user input or automatic detection by the vehicle 102 (e.g., via one or more sensors). In various embodiments, portions of these data can be retrieved based on sensor data indicating a presence of the driver or passenger near the PRB 104 (based on identifying information associated with the stored data relating to the deployed positions of the PRB 104, the identifying information being also stored on or within the memory 144 and including, e.g., information related the detected driver or passenger).

In some embodiments, the presence of the driver or passenger near the PRB 104 or the vehicle 102 may also be detected based on, e.g., a key fob (or other apparatus which may be detected by a sensor based on its proximity to the sensor, for example, which allows a communication between the apparatus and the sensor to take place) belonging to the driver or passenger which may be detected by one or more sensors on or within the vehicle 102. The key fob may include identifying information related to a holder such as the driver or passenger and may be detected automatically (e.g., when within a threshold distance from the vehicle 102) by the vehicle 102 based on a sensor installed on or within the vehicle 102 for sensing and/or communicating with the key fob. For example, the detected/retrieved information may indicate a deployed position of the PRB 104 which results in a certain distance between the steps of the PRB 104 tailored or customized to the detected driver or passenger. In some embodiments, the PRB 104 may be deployed automatically in response to the key fob being detected within the threshold distance from the vehicle 102. In some embodiments, the key fob may be configurable to be powered on or off—allowing the key fob holder to enable or disable the automatic detection of the key fob by the key fob sensor.

The torque source 140 may include one or more of an engine 136 or a motor-generator 138. As referenced herein, the controller 134 may monitor and/or control operation of the torque source 140 (including the engine 136 and/or the motor-generator 138). The engine 136 may convert a fuel into mechanical power for propelling the vehicle 102. In that regard, the engine 136 may be a gasoline engine, a diesel engine, an ethanol engine, or the like, and the vehicle 102 may be, e.g., a fuel engine vehicle or a hybrid vehicle. Optionally, the vehicle 102 may not include the engine 136 and may be a fuel-efficient vehicle (e.g., an electric vehicle, a fuel cell vehicle, etc.) with the motor-generator 138. The motor-generator 138 may convert, e.g., electrical energy stored in an energy storage device (not shown; the energy storage device may store the electrical energy and include one or more energy storage devices including a battery, a flywheel, a super capacitor, a thermal storage device, or the like) or received directly from, e.g., a fuel cell circuit (not shown; the fuel cell circuit may include a plurality of fuel cells (e.g., one or more fuel cell stacks) that facilitate a chemical reaction to generate electrical energy along with a system or systems for providing hydrogen and oxygen (or any other compounds)) into mechanical power usable to propel the vehicle 102. The motor-generator 138 may further convert mechanical power received from the engine 136 or from wheels on the vehicle 102 into electricity, which may be stored in the energy storage device (not shown) as energy and/or used by other components on or within the vehicle 102. In some embodiments, the motor-generator 138 may include a motor without a generator portion, and, in some embodiments, a separate generator may be provided. In various embodiments, the vehicle 102 may include a separate electrical motor or actuator (not shown) configured to drive the PRB 104, while the torque source 140 provides the driving force of the vehicle 102. In some embodiments, the electrical motor or actuator configured to drive the PRB 104 may be connected to a power source (e.g., a battery).

The image sensor 142 may be connected to the main body 130 and may detect image data (including, e.g., a plurality of images and/or videos) corresponding to an environment surrounding the vehicle 102, data corresponding to a vehicle cabin (not shown), and/or the like. For example, the image sensor 142 may include a camera or any other image sensor capable of detecting image data (e.g., based on light having any wavelength). The image sensor 142 may include one or multiple image sensors which may be oriented to detect image data in any direction relative to the main body 130 (and/or within the vehicle cabin). For example, the image sensor 142 may detect image data relating to who is approaching (e.g., getting into) the vehicle 102 and/or getting out of the vehicle 102. The image sensor 142 may also include a camera to detect image data relating to a ground or a ground clearance below the vehicle 102 (i.e., the main body 130). In some embodiments, the image sensor 142 may be attached on or within the vehicle 102 (i.e., the main body 130) such as, e.g., on the side view mirror 132, near or below the PRB 104, a door handle, or a bottom surface on the vehicle 102, and/or the like.

The sensor 146 may include one or more sensors capable of detecting a status of a vehicle component (e.g., the PRB 104) and/or an environment surrounding the vehicle 102. For example, the sensor 146 may include a RADAR (Radio Detection and Ranging) detector or sensor, a LIDAR (Light Detection and Ranging) detector or sensor, a laser-based detector or sensor, a displacement sensor (e.g., optical), and/or the like. In one example, the sensor 146 may include the RADAR or LIDAR detector or sensor(s) to detect RADAR or LIDAR data relating to the ground or the ground clearance below the vehicle 102 (i.e., the main body 130). The sensor 146 may be attached on or within the vehicle 102 (i.e., the main body 130) such as, e.g., on the side view mirror 132, near or below the PRB 104, a door handle, or a bottom surface on the vehicle 102, and/or the like.

In some embodiments, the image sensor 142 and/or the sensor 146 may be a single sensor or an array of sensors. Moreover, in some embodiments, the image sensor 142 and/or the sensor 146 (working independently or cooperatively) may be utilized by, e.g., the controller 134 to make various determinations related to, e.g., managing the movement of the PRB 104. For example, the image sensor 142 and/or the sensor 146 may be utilized to detect the data related to the ground or the ground clearance of the vehicle 102 so as to determine a desired deployed position of the PRB 104.

The input device 148 may include one or more input devices such as a button, a knob, a dial, a keyboard, a mouse, a touchscreen, a microphone, or the like. The input device 148 may receive input from a user of the vehicle 102 such as a driver or a passenger. The input device 148 may receive, for example, information corresponding to a request for cruise control, information usable to control an auxiliary component on or within the vehicle 102 (e.g., to control a navigation device or a stereo), or the like. In some embodiments, the input device 148 may include additional input device(s) usable to control the vehicle 102 such as an accelerator pedal, a brake pedal, a steering wheel, or the like. The input device 148 may also receive information corresponding to a request for the vehicle 102 to drive autonomously. In some embodiments, the input device 148 may include additional input device(s) usable to control the system 100 by manually or automatically controlling one or more operations related to the PRB 104 described herein.

Furthermore, the input device 148 may receive input from a user (a driver or a passenger) regarding, for example, information corresponding to a request for modifying the deployed position of the PRB 104. The request may include information such as an amount by which to raise or lower the PRB 104 and/or change a distance between the vehicle and a highest step of the PRB 104, between two consecutive steps of the PRB 104, and/or between a lowest step of the PRB 104 and the ground. Such a request may be for setting the deployed position of the PRB 104 and/or further modifying the position of the PRB 104 once it is deployed. The input related to such a request may be received via, e.g., an infotainment system, a dial, a knob, and/or the like on or within the vehicle 102.

The output device 150 may include any output device such as a speaker, a display, a touchscreen, or the like. The output device 150 may output data to a user of the vehicle 102. The output device 150 may, for example, output information corresponding to a deployment status of the PRB 104, a status of an environment surrounding the vehicle 102 (e.g., information related to the ground or the ground clearance and/or a graphical representation thereof), and/or the like. Moreover, the output device 150 may output information corresponding to a menu for selecting the desired deployed position of the PRB 104 and/or the amount by which to raise or lower the PRB 104 and/or change the distance between the vehicle and the highest step of the PRB 104, between the two consecutive steps of the PRB 104, and/or between the lowest step of the PRB 104 and the ground discussed herein with reference to the input device 148.

In some embodiments, the user interface 152 may be a user interface device attached to or integrated with the vehicle 102 (e.g., an infotainment system configured to receive or output data). In some embodiments, the user interface 152 may be a user interface available on a remote device (not shown) such as, e.g., a smartphone, a tablet, or the like (e.g., which may be used to run a software program application to control various components on or within the vehicle 102 including the PRB 104) which may be connected to the vehicle 102 via wire or wirelessly. For example, the user interface 152 may be utilized to further adjust the steps 108 or a distance or height of the steps 108 from the ground (e.g., manually or electronically) once the steps 108 are deployed to, e.g., a default configuration (i.e., including a default distance between the steps 108), allowing, for example, a remote control of the steps 108. In some embodiments, the steps 108 may be controlled by a user interface component such as, e.g., a knob or a dial that may be disposed near the PRB 104. Moreover, the vehicle 102 may further include a transceiver or network access device (not shown) which may be utilized to establish a wireless connection between the vehicle 102 and the remote device including the user interface 152. The wireless connection may be provided by any type of wireless connection known in the art such as, for example, Bluetooth, Wi-Fi, a cellular protocol, Zigbee, or any other communications (e.g., wireless) protocol. The network access device may be referred to as a data communication module (DCM) and may communicate with any device or component included in the system 100 and/or any remote device.

In various embodiments, the user interface 152 may include the input device 148 and/or the output device 150. The input device 148 may include an interface for a user to configure one or more parameters related to, e.g., the deployed position of the PRB 104 as described herein. The output device 150 may include another interface (which may be the same as or different from the input interface 148) for a user to, e.g., access or monitor various types of information related to, e.g., the PRB 104 (e.g., its deployment status, etc.) as described herein.

FIGS. 2A-2C are illustrations of various views of example smart multi-tier PRBs with ground sensing technologies. Referring to FIG. 2A, an illustration of an example system 200A is shown. The system 200A may include a vehicle 202A (e.g., a door sill of which is shown) and a PRB 204A which may include one or more support bars 206A and one or more steps 208A. When not in use, the PRB 204A may be in a stowed position 205A. For example, the PRB 204A may be folded away from the ground and towards the vehicle 202A (e.g., the bottom surface or the door sill on the vehicle 202A). In some embodiments, the PRB 204A may be retracted into a pocket or recess (not shown) on the vehicle 202A. As shown, in some embodiments, the PRB 204A may be deployed such that the support bars 206A are substantially perpendicular to a bottom surface or a door sill on the vehicle 202A. As discussed further herein, one or more sensors (e.g., the image sensor 142 and/or the sensor 146 described herein with reference to FIG. 1B) on or within the vehicle 202A may be utilized to detect a groundline 210A, and based on a detected ground clearance (i.e., a distance between the bottom surface or the door sill on the vehicle 202A and the groundline 210A), a controller (e.g., the controller 134 described herein with reference to FIG. 1B) on or within the vehicle 202A may determine a distance 212A between the bottom surface or the door sill on the vehicle 202A and a highest step 208A, between two consecutive steps 208A, and between a lowest step 208A and the groundline 210A such that the distance 212A is identical between the bottom surface or the door sill on the vehicle 202A and the highest step 208A, between the two consecutive steps 208A, and between the lowest step 208A and the groundline 210A.

In some embodiments, additional steps (not shown) may be deployed (e.g., by the additional steps being unfolded from a stowed or retracted position or additional portions of the support bars 206A including the additional steps being deployed from a stowed or retracted position such as a pocket or recess on the vehicle 202A) such that the distance 212A does not exceed a threshold distance (which may be user- or manufacturer-defined or based on user input) beyond which there may be a safety hazard (e.g., falling or tripping hazard). In some embodiments, the distance 212A may also be at least a minimum distance which enables a safe ingress or egress of the vehicle 202A). In various embodiments, at least one step may be deployed to assist the ingress and/or egress of the vehicle 202A, and the number of the deployed steps 208A may be based on, e.g., a detected ground clearance below the vehicle 202A— the number (which may be at least one (1) and less than or equal to a number of available steps 208A) enabling an appropriate level of the distance 212A (i.e., above the minimum distance and/or below the threshold distance) to be achieved.

Turning to FIG. 2B, an illustration of an example system 200B is shown. The system 200B may include a vehicle 202B (e.g., a door sill of which is shown) and a PRB 204B which may include one or more support bars 206B and one or more steps 208B. When not in use, the PRB 204B may be in a stowed position 205B. For example, the PRB 204B may be folded away from the ground and towards the vehicle 202B (e.g., the bottom surface or the door sill on the vehicle 202B). In some embodiments, the PRB 204B may be retracted into a pocket or recess (not shown) on the vehicle 202B. As shown, in some embodiments, the PRB 204B may be deployed such that the support bars 206B and the vehicle 202B (e.g., the bottom surface on the vehicle 202B) form an angle greater than 90 degrees.

As discussed further herein, one or more sensors (e.g., the image sensor 142 and/or the sensor 146 described herein with reference to FIG. 1B) on or within the vehicle 202B may be utilized to detect a groundline 210B, and based on a detected ground clearance (i.e., a distance between the bottom surface or the door sill on the vehicle 202B and the groundline 210B, a controller (e.g., the controller 134 described herein with reference to FIG. 1B) on or within the vehicle 202B may determine the aforementioned angle as well as a distance 212B between the bottom surface or the door sill on the vehicle 202B and a highest step 208B, between two consecutive steps 208B, and between a lowest step 208B and the groundline 210B such that the distance 212B is identical between the bottom surface or the door sill on the vehicle 202B and the highest step 208B, between the two consecutive steps 208B, and between the lowest step 208B and the groundline 210B. Additionally, the aforementioned angle may be determined such that ingress and/or egress of the vehicle 202B is made more convenient. For example, the one or more sensors may detect an obstacle such as a muddy area or a hole immediately below the bottom surface on the vehicle 202B which may make it difficult for a driver and/or a passenger to get into and/or out of the vehicle 202B. In another example, the one or more sensors may detect that an object or structure such as a curb (which may, e.g., serve as a steppingstone) may be present near the vehicle 202B such that deploying the PRB 204B at an angle greater than 90 degrees may make the ingress and/or egress easier (e.g., by keeping the distance 212B at or below a threshold distance beyond which there may be a safety hazard as discussed herein).

In some embodiments, additional steps (not shown) may be deployed (e.g., by the additional steps being unfolded from a stowed or retracted position or additional portions of the support bars 206B including the additional steps being deployed from a stowed or retracted position such as a pocket or recess on the vehicle 202B) such that the distance 212B does not exceed the threshold distance discussed above. In some embodiments, the support bars 206B and the steps 208B (including the support bars and the steps described throughout the present disclosure with reference to various figures) may be connected by one or more respective connectors including actuators which may be controlled by a controller (e.g., the controller 134 described herein with reference to FIG. 1B) to enable movement of the steps 208B (which may each be shaped like, e.g., a rectangular panel or the like for a user to step onto) between a retracted position and a deployed position (e.g., via pivotal rotation of the steps 208B relative to the support bars 206B). The retracted position of the steps 208B may include the steps 208B (i.e., the planar surface of the steps 208B) being folded substantially into a same plane as the support bars 206B (e.g., for easier and/or more compact storage). The deployed position of the steps 208B may include the steps 208B (i.e., the planar surface of the steps 208B) being deployed to be substantially parallel with the groundline 210B (e.g., to make it easier and more convenient for a user to step onto). In some embodiments, the steps 208B may each be shaped like a thin cylinder and be fixed to the support bars 206B (i.e., the steps 208B may not rotate relative to the support bars 206B). Other shapes and/or sizes of the steps 208B (as would be apparent to one of ordinary skill in the art—each including, e.g., a flat surface) may be supported on the PRB 204B without departing from the spirit of the present disclosure, and such shapes and/or sizes of the steps 208B on the PRB 204B would thus be within the scope of the present disclosure.

Referring now to FIG. 2C, a comparison between rear views of an example system 200C and an example system 200D is shown. The system 200C may be similar to the system 200A and include the PRB 204C which may include one or more support bars 206C and one or more steps 208C. The support bars 206C, when deployed, may be substantially perpendicular to the vehicle 202C— similar to as described for the system 200A with reference to FIG. 2A. The system 200D may be similar to the system 200B and include the PRB 204D which may include one or more support bars 206D and one or more steps 208D. The support bars 206D, when deployed, may form an angle greater than 90 degrees with the vehicle 202D— similar to as described for the system 200B with reference to FIG. 2B.

As shown, a same amount of force (F) (from, e.g., weight of a user stepping on the steps 208C and 208D) may be applied onto the step 208C and the step 208D (e.g., the step 208C and the step 208D closest to the ground) in the two configurations. As a brief aside, a Moment (which is a quantity involving a mathematical product of a distance and a quantity such as force) may be defined for the systems 200C and 200D in FIG. 2C as (Moment)=F×w, wherein the w indicates a cantilever distance from the vehicle 202C or the vehicle 202D (e.g., a door sill thereon) to where the F is applied on the step 208C or the step 208D, respectively. Since a cantilever distance $w_1$ in the system 200D is greater than a cantilever distance $w_2$ in the system 200C, the Moment at the step(s) 208D would be higher than the Moment at the step(s) 208C. Thus, in embodiments wherein the system 200D is supported, a greater amount of stress may be applied to the vehicle 202D (e.g., at a frame or a door sill thereof) than in embodiments wherein the system 200D is not supported (i.e., the PRB 204D is not deployed at an angle greater than 90 degrees). Accordingly, in some embodiments (e.g., supporting the system 200D), the vehicle 202D (e.g., including the frame or the door sill as well as any connection between the support bars 206D and the vehicle 202D) may be designed to support a higher amount of stress at, e.g., a joint between the vehicle 202D and the support bars 206D (e.g., based on the Moment applied on the step(s) 208D) than in embodiments wherein the system 200D is not supported (i.e., the PRB 204D is not deployed at an angle greater than 90 degrees). Moreover, in some embodiments, the number of steps 208D may not exceed a threshold number that would result in a $w_1$ value that is too great (i.e., resulting a Moment that is over a threshold Moment) for the vehicle 202D to handle.

In some embodiments, the vehicle 202A-D (e.g., the 0vehicle 102) may support at least one of the mode of the system 200C ("low stress mode") or the mode of the system 200D ("high stress mode"). In some embodiments that support both modes, a user may be able to select a mode by making a selection via, e.g., a user interface (e.g., the user interface 152 including the input device 148 described herein with reference to FIG. 1B). Furthermore, in some embodiments, based on, e.g., the weight of the user (e.g., identified based on a user input or information stored in a memory such as the memory 144 described herein with reference to FIG. 1B) exceeding a threshold weight for a desired deployed position of the PRB 204A-D, the vehicle 202A-D capable of both of the low stress and high stress modes may disable the high stress mode so as to protect the integrity of the vehicle 202A-D (e.g., from the support bars 206A-D and/or the steps 208A-D breaking off of the vehicle 202A-D and/or the support bars 206A-D, respectively). Furthermore, in some embodiments, a controller on or within the vehicle 202A-D (e.g., the controller 134 described herein with reference to FIG. 1B) may configure a predetermined default distance 212A-B which may be based on a make or model of the vehicle 202A-D and/or as set by a manufacturer or a user.

Figure 3:
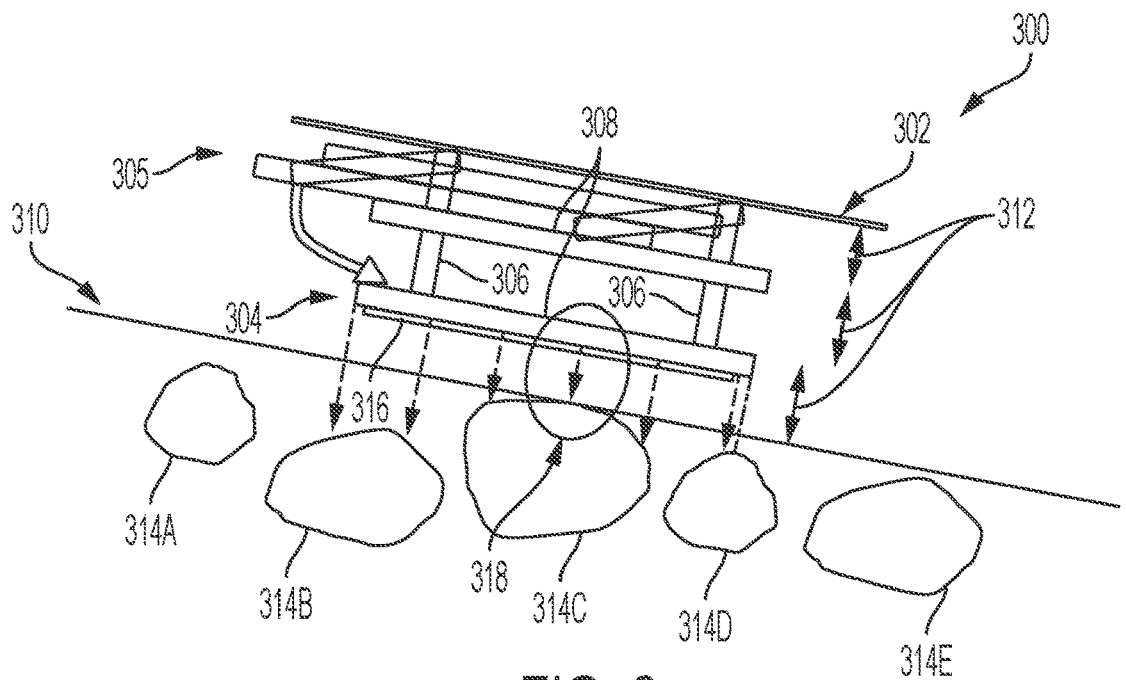
FIG. 3 is an illustration of an example smart multi-tier PRB with ground sensing technologies according to an embodiment of the present invention.

FIG. 3 is an illustration of an example system 300 for providing a smart multi-tier PRB with ground sensing technologies. The system 300 may include a vehicle 302 and a PRB 304. The PRB 304 may include one or more support bars 306 and one or more steps 308. In some embodiments, the PRB 304 may be positioned in a stowed position 305 when not in use. As described herein, the stowed position 305 may include being folded up to a bottom surface on the vehicle 302 and/or being retracted into a pocket or recess (not shown) on or within the vehicle 302. In some embodiments, the system 300 may also include a sensor 316 (e.g., an image sensor 142 and/or a sensor 146 described herein with reference to FIG. 1B) which may be utilized to detect sensor data related to a ground or groundline 310. The sensor 316 may be attached to, e.g., the PRB 304, as shown in FIG. 3. In addition or alternatively, as described herein, the sensor 316 may be located in other areas on or within the vehicle 302. The sensor data may include information related to various portions of the ground or ground line 310 including information related to portions (e.g., including rocks and/or the like) 314A-E. The highest point 314C of the ground or groundline 310 detected by the sensor 316 may be utilized by the vehicle 302 (e.g., its controller) to determine a critical depth 318 between the highest point 314C and a lowest step of the PRB 304 in a deployed position. The critical depth 318 may be utilized by the vehicle 302 (e.g., its controller) to determine a distance 312 between the vehicle 302 and the highest step of the PRB 304, between two consecutive steps of the PRB 304, and/or between the lowest step of the PRB 304 and the ground or groundline 310.

Figure 4:
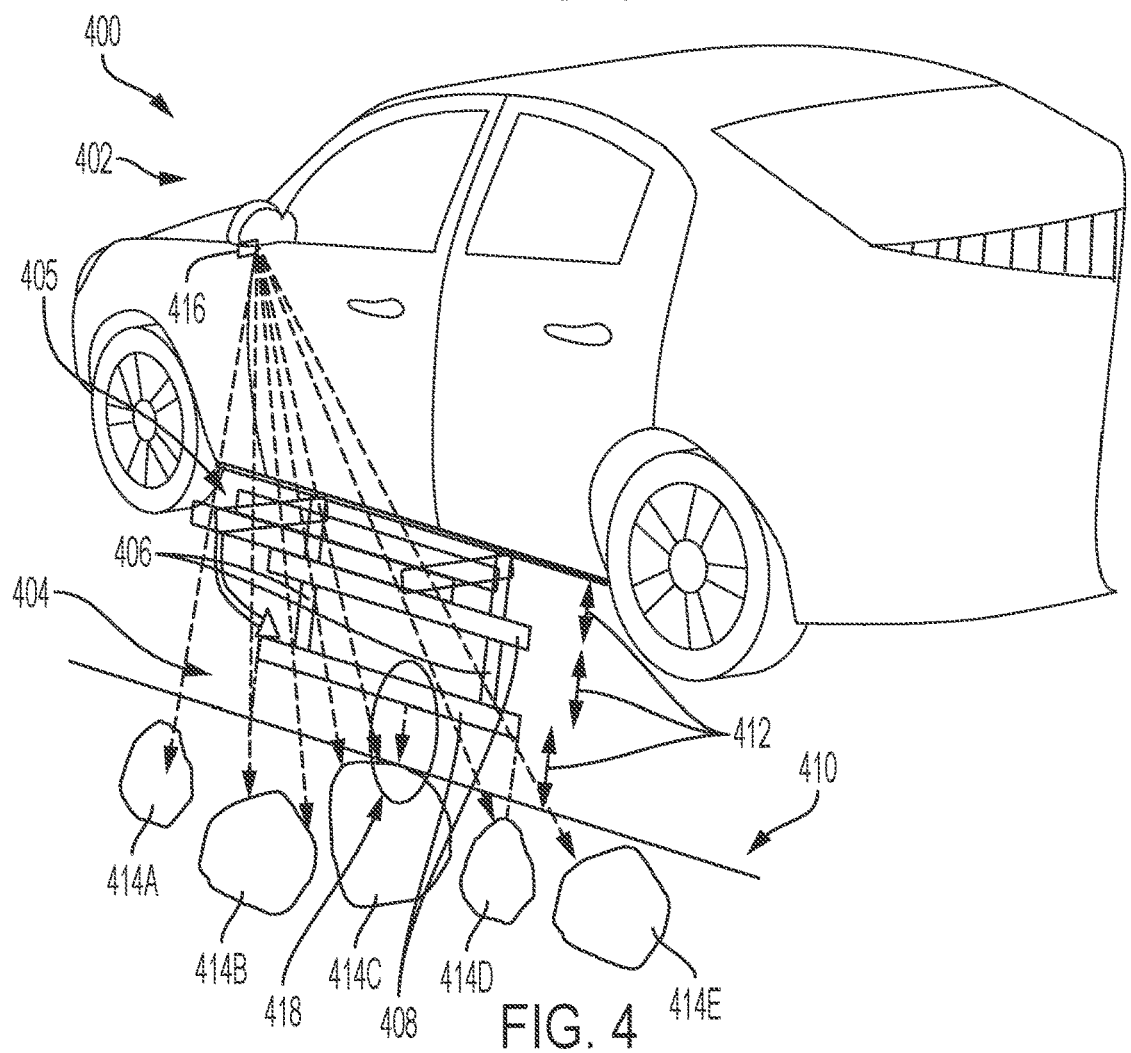
FIG. 4 is an illustration of an example smart multi-tier PRB with ground sensing technologies according to an embodiment of the present invention.

FIG. 4 is an illustration of an example system 400 for providing a smart multi-tier PRB with ground sensing technologies. The system 400 may include a vehicle 402 and a PRB 404. The PRB 404 may include one or more support bars 406 and one or more steps 408. In some embodiments, the PRB 404 may be positioned in a stowed position 405 when not in use. As described herein, the stowed position 405 may include being folded up to a bottom surface on the vehicle 402 and/or being retracted into a pocket or recess (not shown) on or within the vehicle 402. In some embodiments, the system 400 may also include a sensor 416 (e.g., an image sensor 142 and/or a sensor 146 described herein with reference to FIG. 1B) which may be utilized to detect sensor data related to a ground or groundline 410. The sensor 416 may be attached to, e.g., a side view mirror on the vehicle 402, as shown in FIG. 4. In addition or alternatively, as described herein, the sensor 416 may be located in other areas on or within the vehicle 402. The sensor data may include information related to various portions of the ground or ground line 410 including information related to portions (e.g., including rocks and/or the like) 414A-E. The highest point 414C of the ground or groundline 410 detected by the sensor 416 may be utilized by the vehicle 402 (e.g., its controller) to determine a critical depth 418 between the highest point 414C and a lowest step of the PRB 404 in a deployed position. The critical depth 418 may be utilized by the vehicle 402 (e.g., its controller) to determine a distance 412 between the vehicle 402 and the highest step of the PRB 404, between two consecutive steps of the PRB 404, and/or between the lowest step of the PRB 404 and the ground or groundline 410.

Figure 5:
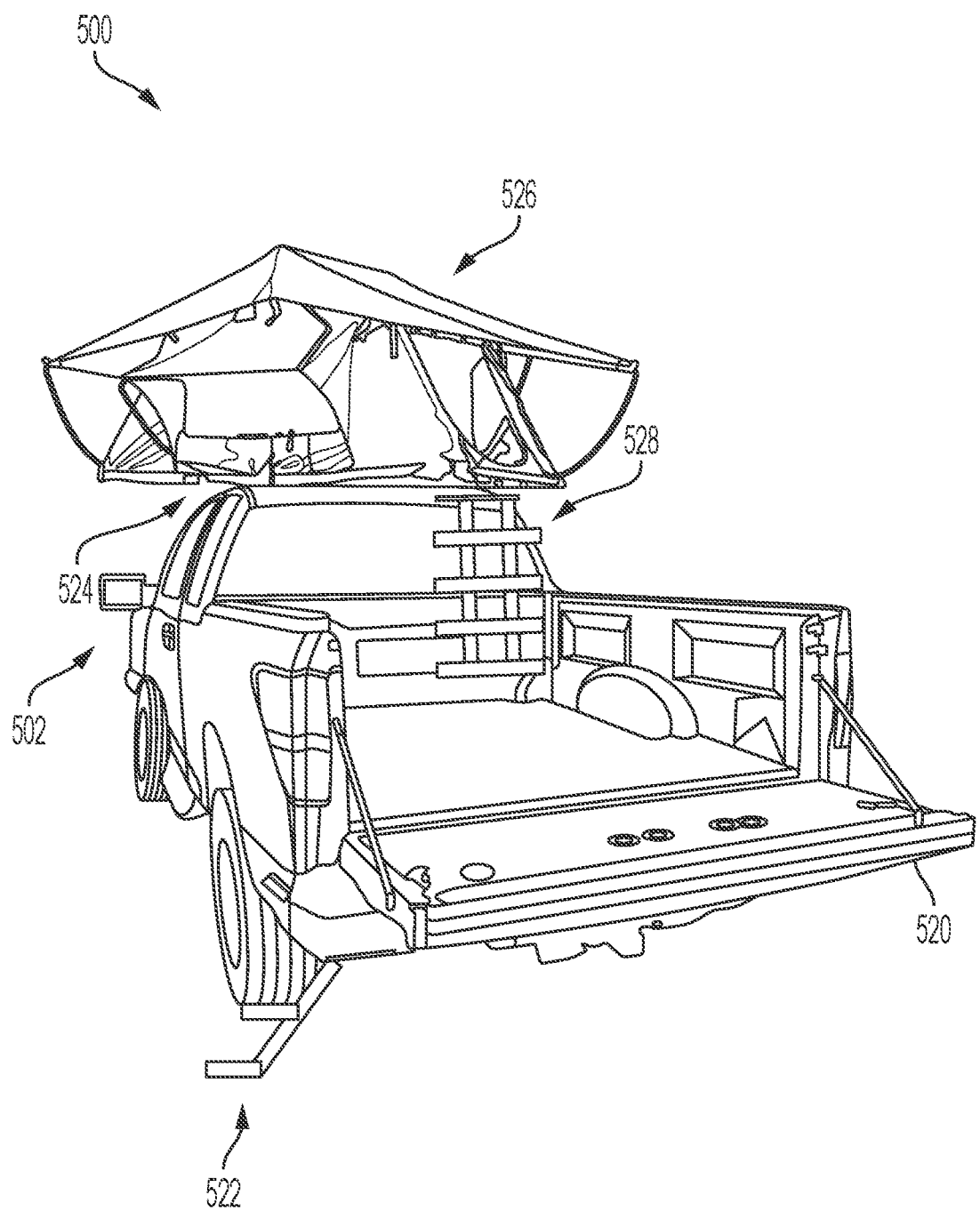
FIG. 5 is an illustration of an example vehicle including an apparatus or system for providing a smart multi-tier PRB with ground sensing technologies according to an embodiment of the present invention.

FIG. 5 is an illustration of an example system 500 for a smart multi-tier PRB including a vehicle 502, a first PRB 522, and a second PRB 528. The vehicle 502 may be similar to the vehicle 102 described herein and include a smart multi-tier PRB for getting in and/or out of the vehicle 502 as described herein. In addition and/or alternatively, the vehicle 502 may also include the first PRB 522 for getting in and/or out of the vehicle 502 (e.g., a truck bed) through a tail gate 520 and/or the second PRB 528 for getting onto a roof 524 on the vehicle 502 for such activity as overlanding which includes setting up a tent 526 on the roof 524 on the vehicle 502. The first PRB 522 may utilize the ground sensing technologies described herein to automatically deploy the first PRB 522 to a position which allows easy and safe ingress and/or egress of the vehicle 502 through the tail gate 520 (e.g., for getting onto and/or out of a truck bed). Moreover, the second PRB 528 may utilize the ground sensing technologies described herein to detect what is present, e.g., on the truck bed near a rear windshield or on the ground near where the second PRB 528 may be deployed and automatically deploy the second PRB 528 to a position which allows easy and safe ingress and/or egress of the roof 524 (e.g., the tent 526) on the vehicle 502.

Figure 6:
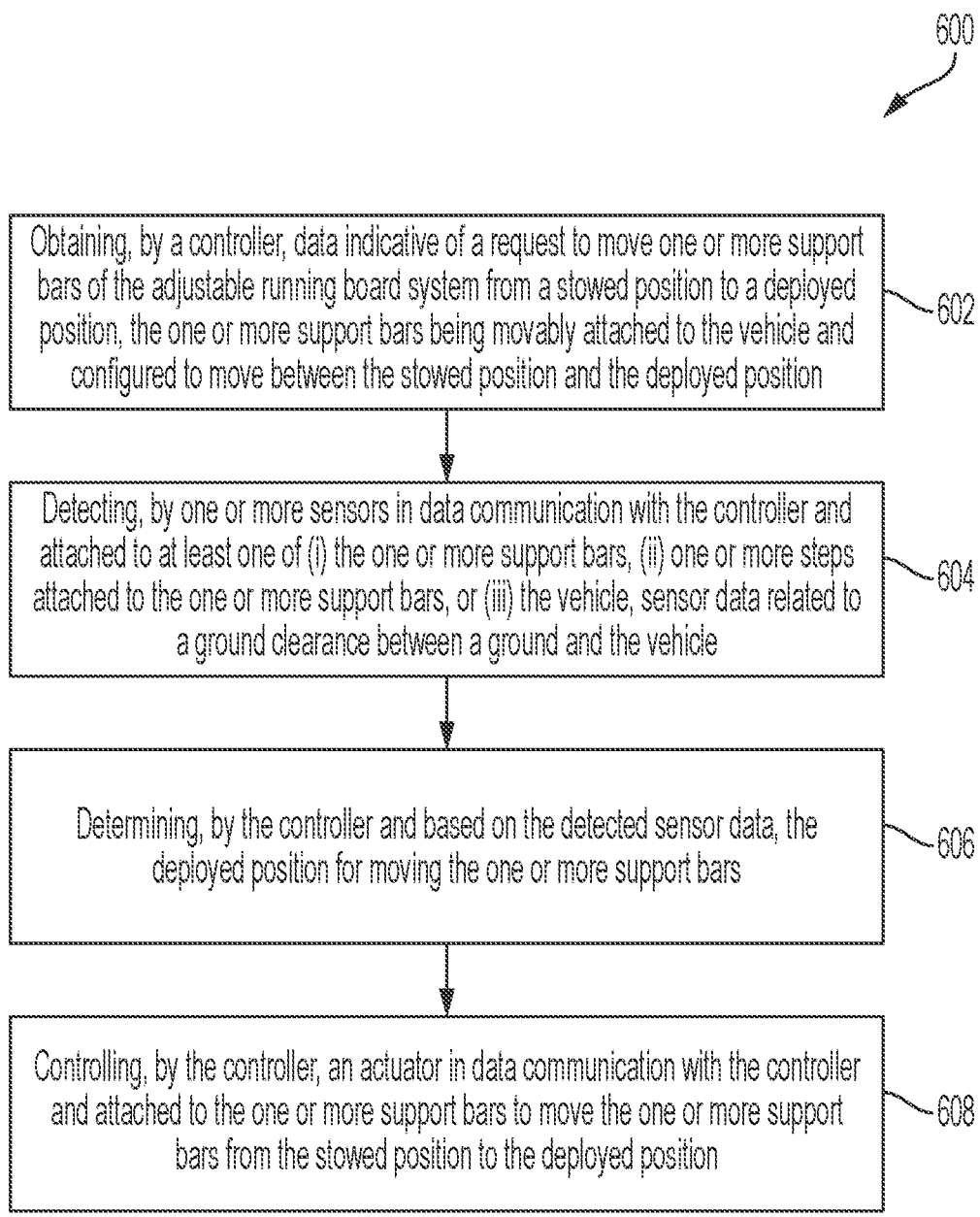
FIG. 6 is a flowchart illustrating a method for providing a smart multi-tier PRB with ground sensing technologies according to an embodiment of the present invention.

FIG. 6 is a flowchart illustrating a method 600 for providing a smart multi-tier PRB with ground sensing technologies. The method 600 includes obtaining, by a controller, data indicative of a request to move one or more support bars of the adjustable running board system from a stowed position to a deployed position, the one or more support bars being movably attached to the vehicle and configured to move between the stowed position and the deployed position (step 602); detecting, by one or more sensors in data communication with the controller and attached to at least one of (i) the one or more support bars, (ii) one or more steps attached to the one or more support bars, or (iii) the vehicle, sensor data related to a ground clearance between a ground and the vehicle (step 604); determining, by the controller and based on the detected sensor data, the deployed position for moving the one or more support bars (step 606); and controlling, by the controller, an actuator in data communication with the controller and attached to the one or more support bars to move the one or more support bars from the stowed position to the deployed position (step 608).

In some embodiments, obtaining the data indicative of the request to move the one or more support bars from the stowed position to the deployed position in step 602 may include detecting that a door on the vehicle is open.

In various embodiments, detecting the sensor data in step 604 may include detecting a highest point of the ground below a door on the vehicle. Moreover, determining the deployed position of the one or more support bars in step 606 may include determining a distance between the vehicle and the highest point of the ground below the door on the vehicle and evenly dividing the distance between the vehicle and the highest point of the ground below the door on the vehicle based on a number of the one or more steps.

In some embodiments, controlling the actuator in step 608 may include controlling the actuator to automatically move the one or more support bars from the stowed position to the deployed position such that a first distance between the vehicle and a step of the one or more steps farthest from the ground, a second distance between two consecutive steps of the one or more steps, and a third distance between a step of the one or more steps closest from the ground and the ground are identical.

Furthermore, in some embodiments, the method 600 may further include receiving data related to a user input associated with the deployed position of the one or more support bars and controlling the actuator in step 608 may include controlling the actuator to move the one or more support bars according to the user input.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. An adjustable running board apparatus for a vehicle, the apparatus comprising:
   one or more support bars movably attached to the vehicle and configured to move between a stowed position and a deployed position;
   a plurality of steps where each step is attached to the one or more support bars;
   an actuator connected to one end of each support bar of the one or more support bars, the actuator being configured to:
      cause the one or more support bars to move between the stowed position and the deployed position, and
      adjust a position of each step of the plurality of steps in the deployed position;
   one or more sensors attached to at least one of the one or more support bars, the plurality of steps, or the vehicle, the one or more sensors being configured to detect sensor data related to a ground clearance between a ground and the vehicle; and
   a controller coupled to the actuator and the one or more sensors and configured to:
      obtain data indicative of a request to move the one or more support bars from the stowed position to the deployed position,
      determine, based on the detected sensor data, the position of each step of the plurality of steps in the deployed position such that a first distance between the vehicle and a first step of the plurality of steps is equal to:
         a second distance between two consecutive steps of the plurality of steps, and
         a third distance between a second step of the plurality of steps and the ground or a truck bed on the vehicle, and
      control, based on the determined position of each step of the plurality of steps, the actuator to move the one or more support bars from the stowed position to the deployed position.

2. The apparatus of claim 1, wherein:
   the one or more support bars are movably attached within a threshold distance from a component on the vehicle, the component being a door, a roof, or a tail gate on the vehicle, the adjustable running board apparatus being configured for ingress or egress of, respectively, a cabin space, the roof, or the truck bed on or within the vehicle;
   the sensor data includes information related to a highest point of the ground below the component on the vehicle; and
   the determination of the position of each step of the plurality of steps in the deployed position includes a determination of a distance between the component on the vehicle and the highest point of the ground and an even division of the distance between the component on the vehicle and the highest point of the ground based on a number of the plurality of steps to be deployed.

3. The apparatus of claim 1, wherein:
   the sensor data includes information related to the ground clearance between a truck bed on the vehicle and a roof on the vehicle;
   the adjustable running board apparatus is configured for ingress or egress of the roof on the vehicle from or to the truck bed on the vehicle; and
   the determination of the position of each step of the plurality of steps in the deployed position includes a determination of a distance between the roof on the vehicle and the truck bed on the vehicle and an even division of the distance between the roof on the vehicle and the truck bed on the vehicle based on a number of the plurality of steps to be deployed.

4. The apparatus of claim 1, wherein the one or more sensors include a RADAR (Radio Detection and Ranging) sensor attached to an exterior component or the adjustable running board apparatus on the vehicle.

5. The apparatus of claim 1, wherein the one or more sensors include a LIDAR (Light Detection and Ranging) sensor attached to an exterior component or the adjustable running board apparatus on the vehicle.

6. The apparatus of claim 1, wherein the one or more sensors include an image sensor attached to an exterior component or the adjustable running board apparatus on the vehicle.

7. The apparatus of claim 1, wherein the one or more support bars in the deployed position are configured to be substantially perpendicular to a bottom surface on the vehicle facing the ground.

8. The apparatus of claim 1, wherein the one or more support bars in the deployed position are configured to be at an angle greater than 90 degrees with a bottom surface on the vehicle facing the ground such that a bottom step of the plurality of steps closest to the ground is radially farther from the vehicle than a top step of the plurality of steps closest to the bottom surface on the vehicle.

9. An adjustable running board system for a vehicle, the system comprising:
   one or more support bars movably attached to the vehicle and configured to move between a stowed position and a deployed position;
   a plurality of steps each moveably attached to the one or more support bars and each configured to move between a retracted position and another deployed position;
   one or more actuators connected to each step of the plurality of steps and one end of each support bar of the one or more support bars, the one or more actuators being configured to:
      cause the one or more support bars to move between the stowed position and the deployed position, and cause the plurality of steps to move between the retracted position and the another deployed position;
one or more sensors attached to at least one of the one or more support bars, the plurality of steps, or the vehicle, the one or more sensors being configured to detect sensor data related to a ground clearance between a ground and the vehicle; and
a controller coupled to the one or more actuators and the one or more sensors and configured to:
obtain data indicative of a request to move the one or more support bars from the stowed position to the deployed position,
determine, based on the detected sensor data, the deployed position for moving the one or more support bars,
determine, based on the detected sensor data, a number of steps of the plurality of steps to be moved from the retracted position to the another deployed position,
control, based on the determined deployed position, the one or more actuators to move the one or more support bars from the stowed position to the deployed position, and
control the one or more actuators to move the determined number of steps from the retracted position to the another deployed position.

10. The system of claim 9, wherein the vehicle includes a pocket or recess; and
wherein the one or more support bars are configured to be moved into the pocket or recess when the one or more support bars are in the stowed position.

11. The system of claim 9, wherein the vehicle includes a bottom surface facing the ground; and
wherein the one or more support bars are configured to be moved to be underneath and substantially parallel with the bottom surface on the vehicle when the one or more support bars are in the stowed position.

12. The system of claim 9, wherein the plurality of steps are configured to be in the retracted position to save space and in the another deployed position to allow a driver or passenger to step on the plurality of steps.

13. The system of claim 9, wherein the determination of the deployed position of the one or more support bars includes a determination of a position of the one or more support bars and a position of each step of the plurality of steps such that a first distance between the vehicle and a top step of the plurality of steps farthest from the ground is equal to:
a second distance between two consecutive steps of the plurality of steps, and
a third distance between the ground and a bottom step of the plurality of steps closest to the ground.

14. The system of claim 9, further comprising a memory configured to store profile data including information related to one or more deployed positions of the one or more support bars corresponding to one or more respective drivers or passengers, the information including a distance between two consecutive steps of the plurality of steps.

15. A method for providing an adjustable running board system for a vehicle, the method comprising:
obtaining, by a controller, data indicative of a request to move one or more support bars of the adjustable running board system from a stowed position to a deployed position, the one or more support bars being movably attached to the vehicle and configured to move between the stowed position and the deployed position;
detecting, by one or more sensors in data communication with the controller and attached to at least one of the one or more support bars, a plurality of steps, or the vehicle, sensor data related to a ground clearance between a ground and the vehicle, the plurality of steps being movably attached to the one or more support bars and each configured to move between a retracted position and another deployed position;
determining, by the controller and based on the detected sensor data, the deployed position for moving the one or more support bars;
determining, by the controller and based on the detected sensor data, a number of steps of the plurality of steps to be moved from the retracted position to the another deployed position;
controlling, by the controller, one or more actuators in data communication with the controller and attached to the one or more support bars and the plurality of steps to move the one or more support bars from the stowed position to the deployed position; and
controlling, by the controller, the one or more actuators to move the number of steps from the retracted position to the another deployed position.

16. The method of claim 15, wherein obtaining the data indicative of the request to move the one or more support bars from the stowed position to the deployed position includes detecting that a door on the vehicle is open.

17. The method of claim 15, wherein obtaining the data indicative of the request to move the one or more support bars from the stowed position to the deployed position includes detecting, by a key fob sensor, that a key fob associated with a user is within a threshold distance from the vehicle, the key fob being configurable to be powered on or off.

18. The method of claim 15, wherein:
detecting the sensor data includes detecting a highest point of the ground below a door on the vehicle; and
determining the deployed position of the one or more support bars includes determining a distance between the vehicle and the highest point of the ground below the door on the vehicle and evenly dividing the distance between the vehicle and the highest point of the ground below the door on the vehicle based on the number of steps.

19. The method of claim 15, wherein controlling the one or more actuators to move the one or more support bars includes controlling the one or more actuators to automatically move the one or more support bars from the stowed position to the deployed position such that a first distance between the vehicle and a top step of the plurality of steps farthest from the ground is equal to:
a second distance between two consecutive steps of the plurality of steps, and
a third distance between the ground and a bottom step of the plurality of steps closest to the ground.

20. The method of claim 19, further comprising receiving, from a remote device in data communication with the controller, data related to a user input associated with the deployed position of the one or more support bars, the user input including a weight of the user or a maximum distance of the first distance; and
wherein controlling the one or more actuators to move the one or more support bars includes controlling the one or more actuators to move the one or more support bars according to the user input.

* * * * *